(12) United States Patent
Sakargayan et al.

(10) Patent No.: US 11,074,060 B2
(45) Date of Patent: Jul. 27, 2021

(54) AUTOMATED DETECTION OF PATCH CRITICALITY ON CUSTOMER ENVIRONMENT

(71) Applicant: VMware, Inc., Palo Alto, CA (US)

(72) Inventors: Gourav Kumar Sakargayan, Sunnyvale, CA (US); Gopala Suryanarayana, Cupertino, CA (US); Abhijit Seal, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/192,036

(22) Filed: Nov. 15, 2018

(65) Prior Publication Data
US 2020/0159515 A1 May 21, 2020

(51) Int. Cl.
| | | |
|---|---|---|
| *G06F 9/44* | (2018.01) | |
| *G06F 8/65* | (2018.01) | |
| *G06F 9/455* | (2018.01) | |
| *G06F 9/445* | (2018.01) | |
| *G06F 8/71* | (2018.01) | |

(52) U.S. Cl.
CPC .............. *G06F 8/65* (2013.01); *G06F 8/71* (2013.01); *G06F 9/445* (2013.01); *G06F 9/45533* (2013.01)

(58) Field of Classification Search
CPC ......................................................... G06F 8/65
USPC ............................................................ 717/168
See application file for complete search history.

(56) References Cited

U.S. PATENT DOCUMENTS

| | | | |
|---|---|---|---|
| 6,477,703 B1 | 11/2002 | Smith et al. | |
| 6,954,928 B2 | 10/2005 | Allsop et al. | |
| 7,765,538 B2 | 7/2010 | Zweifel et al. | |
| 7,921,421 B2 * | 4/2011 | Kawaguchi | G06F 9/4411 717/170 |
| 8,181,173 B2 * | 5/2012 | Childress | G06F 8/65 709/203 |
| 8,484,636 B2 | 7/2013 | Mehta et al. | |
| 9,009,663 B2 * | 4/2015 | Kunze | G06F 8/62 717/120 |
| 9,058,239 B2 * | 6/2015 | Madl, III | G06F 9/45558 |
| 9,229,705 B2 * | 1/2016 | Kuzmack | G06F 9/45558 |
| 9,600,258 B2 | 3/2017 | Ramachandran et al. | |
| 9,639,698 B2 * | 5/2017 | Yudin | G06F 21/53 |
| 9,930,051 B1 * | 3/2018 | Potlapally | H04L 63/126 |
| 10,725,767 B2 * | 7/2020 | Jose | H04L 9/3239 |

(Continued)

*Primary Examiner* — Evral E Bodden
(74) *Attorney, Agent, or Firm* — Patterson + Sheridan, LLP (57) ABSTRACT

The disclosure provides an approach for recommending and installing a patch onto a first computing device, comprising: parsing a machine-readable document for a property variable and a possible value of the property variable, wherein the combination of the property variable and the possible value represents a criticality of installing the patch; transmitting a request to the first computing device for a first value of the first computing device, the first value representing a state of the first computing device corresponding to the property variable; receiving the first value; comparing the possible value to the first value; based on the comparing, performing a first determination of the criticality of installing the patch onto the first computing device; and based on the criticality of installing the patch, installing the patch onto the first computing device.

20 Claims, 2 Drawing Sheets

(56) References Cited

U.S. PATENT DOCUMENTS

| | | | |
|---|---|---|---|
| 2010/0037216 A1* | 2/2010 | Carcerano | G06F 8/65 717/173 |
| 2010/0125839 A1* | 5/2010 | Gebis | G06F 8/71 717/170 |
| 2013/0326499 A1 | 12/2013 | Mowatt et al. | |
| 2015/0100955 A1* | 4/2015 | Chen | G06F 8/658 717/170 |
| 2015/0301818 A1* | 10/2015 | Voronkov | G06F 8/65 717/168 |

* cited by examiner

AUTOMATED DETECTION OF PATCH CRITICALITY ON CUSTOMER ENVIRONMENT

BACKGROUND

In addition to major software releases, software providers sometimes release patches to their software programs that provide updates, such as bug fixes. A patch may not be necessary for certain computing devices to install, especially for those computing devices that do not use functionalities that the patch has modified. For example, if a patch only includes bug fixes for encryption, then only those computing devices that use encryption may need to install that patch. Installing patches on clusters of multiple computing devices is nontrivial, consumes resources, and causes downtime. As a result, each computing device in a data center installing every patch for every software program running on each computing device is inefficient.

SUMMARY

According to one embodiment, a method of installing a patch onto a first computing device, comprising: parsing a machine-readable document for a property variable and a possible value of the property variable, wherein the combination of the property variable and the possible value represents a criticality of installing the patch; transmitting a request to the first computing device for a first value of the first computing device, the first value representing a state of the first computing device corresponding to the property variable; receiving the first value; comparing the possible value to the first value; based on the comparing, performing a first determination of the criticality of installing the patch onto the first computing device; and based on the criticality of installing the patch, installing the patch onto the first computing device.

Further embodiments of the present invention include a computer system configured to carry out the above method and a non-transitory computer readable medium comprising instructions to be executed in a processor of a computer system, the instructions causing the computer system to carry out the above method.

DETAILED DESCRIPTION

In order to determine the criticality of installing a patch onto a computing device (e.g., the various computing devices in a data center), a machine-readable document is generated along with each patch. A hardware or software component parses the machine-readable document for rules that dictate how to determine criticality of installing a patch onto the various computing devices. In certain embodiments, criticality is a variable that can take on a range of values expressing the importance of installing a patch, such as corresponding to very critical, less critical, or not critical. In certain embodiments, each value of criticality is assigned a color, the color expressing the importance of installing the patch. For example, the color "red" may indicate a "very critical" patch, the color "yellow" may indicate a "less critical" patch, and the color "blue" may indicate a "not critical" patch. By default, the value for criticality for a computing device may be set to "not critical." The hardware or software component that parsed the machine-readable document applies the rules to values that are stored in the various computing devices. The hardware or software component only installs a patch onto a computing device if criticality of the patch for the computing device is assigned at least a particular value/color. For example, the hardware or software component may be configured to install a patch onto a computing device if the value for that computing device is "very critical."

Figure 1:
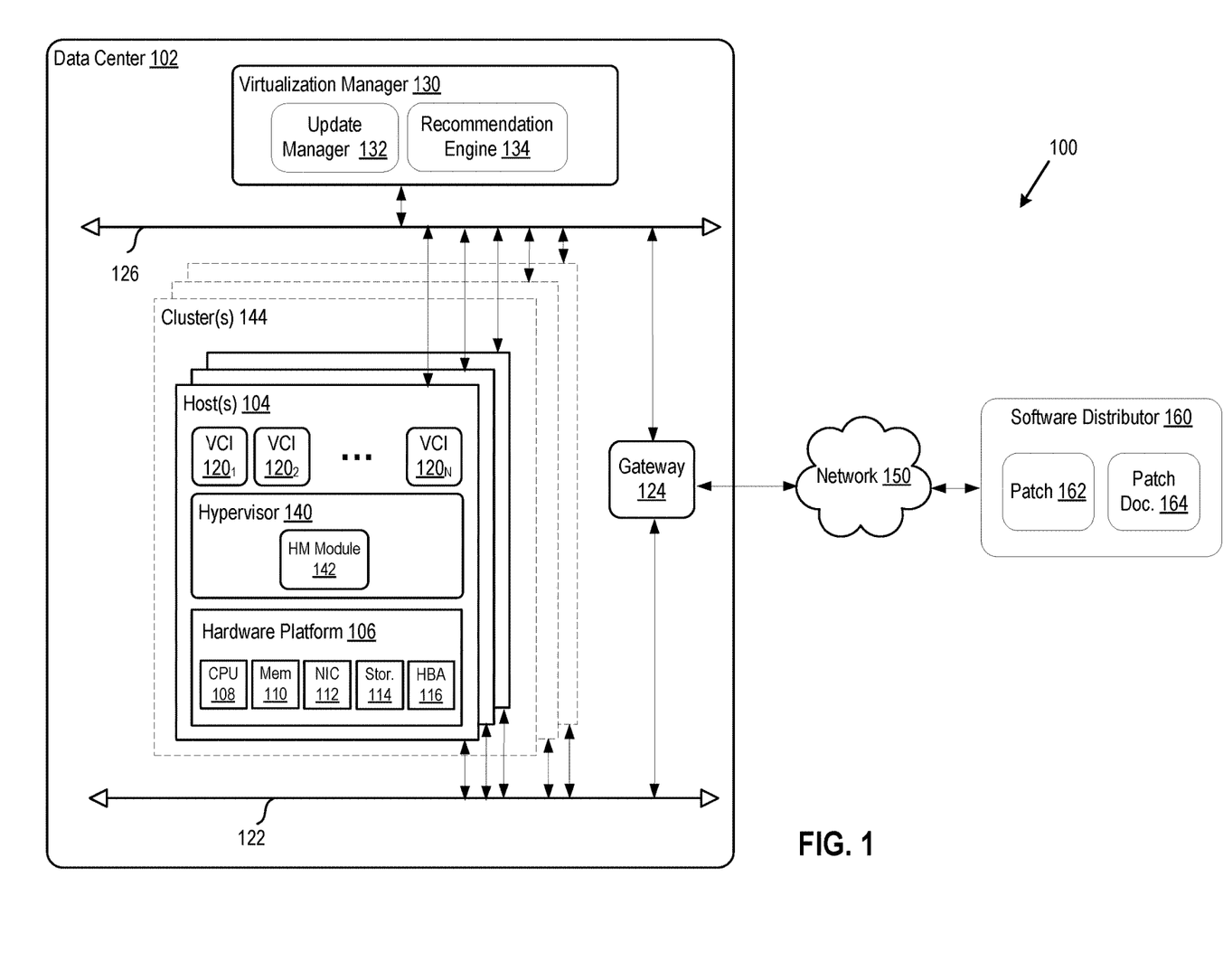
FIG. 1 depicts a block diagram of a computer system in which one or more embodiments of the present disclosure may be utilized.

FIG. 1 depicts a block diagram of a computer system 100 in which one or more embodiments of the present disclosure may be utilized. Computer system 100 includes a data center 102 and a software distributor 160 that are connected by a network 150, such as the Internet. Data center 102 may be either an on-premise or cloud data center.

Data center 102 includes one or more hosts 104, one or more clusters of hosts 144, a virtualization manager 130, a gateway 124, a data network 122, and a management network 126. Although data network 122 and management network 126 are shown as separate physical networks, different virtual local area network (VLAN) identifiers may logically isolate data network 122 from management network 126.

Each of hosts 104 may be constructed on a server grade hardware platform 106, such as an x86 architecture platform. For example, hosts 104 may be geographically co-located servers on the same rack or may be arbitrarily-located servers on different racks in data center 102. A cluster 144 includes one or more hosts 104 that may be managed as a group rather than individually. A hardware or software component, such as virtualization manager 130, may manage hosts 104 of cluster 144 as a group. Alternatively, a customer may manage hosts 104 of cluster 144 as a group. In an embodiment, cluster 144 is a group of hosts 104 within the same data center 102.

Each host 104 is configured to provide a virtualization layer, also referred to as a hypervisor 140. Hypervisor 140 abstracts the processor, memory, storage, and networking resources of a hardware platform 106 into multiple virtual computing instances (VCIs) $120_1$ to $120_N$, referred to individually as a VCI 120 and collectively as VCIs 120. As used herein, the term "VCIs" may refer to virtual machines (VMs), containers, Docker containers, data compute nodes, isolated user space instances, namespace containers, etc. VCIs 120 may run concurrently on the same host 104. In certain embodiments, VCIs 120 may be containers that run on host 104 without the use of hypervisor 140. An example of hypervisor 140 is the VMware vSphere® Hypervisor, which is made available by VMware, Inc.

Hypervisor architecture may vary. Hypervisor 140 may run on top of the operating system (OS) (not shown) of host 104 or directly on hardware platform 106. In some embodiments, hypervisor 140 can be installed directly on server hardware 106 as system-level software (a.k.a. "bare metal" installation). Hypervisor 140 can thus be conceptually interposed between hardware platform 106 and the guest OS's executing in VMs. Alternatively, hypervisor 140 may conceptually run on top of a conventional host OS in a server. In some implementations, hypervisor 140 may comprise system-level software as well as a "Domain 0" or "Root Partition" VM. A Domain 0 or Root Partition VM is a privileged VM that has access to the physical hardware resources of the VM's host. In this implementation, hardware drivers and one or more of a virtual switch, virtual tunnel endpoint (VTEP), etc., may reside in the privileged VM.

Hardware platform 106 may include components of a computing device, including one or more central processing unit (CPU) s 108, system memory 110, a network interface 112, a storage system 114, a host bus adapter (HBA) 116, and other I/O devices, such as a mouse and keyboard (not shown). CPU 108 is configured to execute instructions and perform one or more operations described herein. Network interface 112 enables host 104 to communicate with other devices via a communication medium, such as data network 122 and/or management network 126. Network interface 112 may include one or more network adapters or ports, also referred to as network interface cards (NICs), for connecting to one or more physical networks. In certain embodiments, data network 122 and management network 126 may be different physical networks as shown, and hosts 104 may be connected to each of data network 122 and management network 126 via either separate network interfaces 112 or separate ports on the same network interface 112. In other embodiments, data network 122 and management network 126 may correspond to different network segments of the same physical network (e.g., different subnets or different logical VLAN segments).

System memory 110 is hardware that allows information (e.g., executable instructions and configurations), to be stored and retrieved. Memory 110 is where programs and data are stored when a CPU 108 is actively using them. Memory 110 may be either volatile or non-volatile.

Storage system 114 represents one or more persistent storage devices (e.g., hard disks, flash memory modules, solid state disks, and/or optical disks). HBA 116 couples host 104 to one or more external storage devices (not shown) via a network, such as a storage area network (SAN) or distributed virtual SAN (VSAN). Other usable external storage systems include a network-attached storage (NAS) system and any other network data storage system that is accessible via network interface 112.

Hypervisor 140 includes a health monitoring (HM) module 142. HM module 142 collects local health information of VCIs 120 by polling VCIs 120 running on the same host 104. HM module 142 requests local health information and each VCI 120 responds with a message containing the VCI's respective health information. In some embodiments, HM module 142 may instead run directly on host 104 (i.e., outside but in communication with hypervisor 140). The health information of VCI 120 may include the aliveness of VCI 120, the number of active connections between VCI 120 and other data center 102 components, the percent utilization of the virtual CPU(s) of VCI 120, the percent utilization of the virtual memory allocated to VCI 120, whether or not a service (e.g., hypertext transfer protocol (HTTP) or file transfer protocol (FTP) service) of VCI 120 is operational, etc. Aliveness refers to whether or not VCI 120 is operational. As used herein, "local health information" refers to health information of VCIs 120 located on the same host 104 as the HM module 142 collecting the health information.

Gateway 124 is a hardware or software component that provides VCIs 120 and other components in data center 102 with connectivity to network 150. Gateway 124 may manage external public IP addresses for VCIs 120 and route traffic incoming to and outgoing from data center 102. Gateway 124 may also provide networking services, such as firewalls, network address translation (NAT), dynamic host configuration protocol (DHCP), and load balancing. Gateway 124 may use data network 122 to transmit packets to hosts 104. In various embodiments, gateway 124 may be a virtual computing instance, physical device, or software module running within host 104.

Virtualization manager 130 communicates with hosts 104 via management network 126 and carries out administrative tasks for data center 102 such as managing hosts 104, managing local VMs 120 running within each host 104, provisioning VMs 120, migrating VMs 120 from one host 104 to another host 104, and load balancing between hosts 104. Virtualization manager 130 may be a computer program that resides and executes in a central server in data center 102. Alternatively, virtualization manager 130 may run as a virtual appliance (e.g., a VM) in one of hosts 104. An example of virtualization manager 130 is the VMware vCenter Server®, which is made available by VMware, Inc.

Software distributor 160 may be a third-party server or data center that provides software programs. Software distributor 160 also provides information on patches to software programs, the information being in the form of patch documents 164. Upon request by a component within data center 102, software distributor 160 transmits "major" software releases (not shown) and patches 162 to hosts 104 via network 150. A major software release is a complete software program. A major software release may be a hypervisor 140 or other third-party software that runs on hosts 104. Patch 162 is a set of changes to a major release, or a set of changes to supporting data of that major release.

Virtualization manager 130 contains an update manager 132 and a recommendation engine 134. Update manager 132 is a hardware or software component that installs patch 162 onto hosts 104. An example of update manager 132 is the VMware vSphere® Update Manager™, which is made available by VMware, Inc. Recommendation engine 134 is a hardware or software component that determines whether or not update manager 132 should install patch 162 onto hosts 104. Although not shown, in some embodiments, update manager 132 and recommendation engine 134 may exist outside of virtualization manager 130.

Patch document 164 is a machine-readable file, such as a JavaScript Object Notation (JSON) file. Patch document 164 is a document that provides information regarding a released patch 162. Patch document 164 includes rules that indicate how to determine criticality of installing patch 162 onto host 104. Rules of patch document 164 include property variables, possible values of those property variables, and logic for determining criticality based on the property variables and possible values. State of host 104 corresponds to various possible values of the property variables.

Criticalities for various hosts 104 in data center 102 may differ for the same patch. For example, for patch 162, criticality may be "red" or "very critical" for a first host 104. For the same patch 162, criticality may be "blue" or "not critical" for a second host 104. Update manager 132 may initiate an installation of patch 162 onto only the first host 104, criticality for the first host being "red."

Although computer system 100 is depicted with respect to one or more hosts 104 running in data center 102, a person having ordinary skill in the art would recognize the applicability of this invention in other computer systems. For example, recommendation engine 134 may make installation decisions for clusters 144 from one data center 102 and clusters 144 from another data center 102. Update manager 132 may then install patch 162 onto hosts 104 in clusters 144 of each data center 102. Those data centers 102 could be on-premise data centers, cloud data centers, or a combination of on-premise and cloud data centers.

Figure 2:
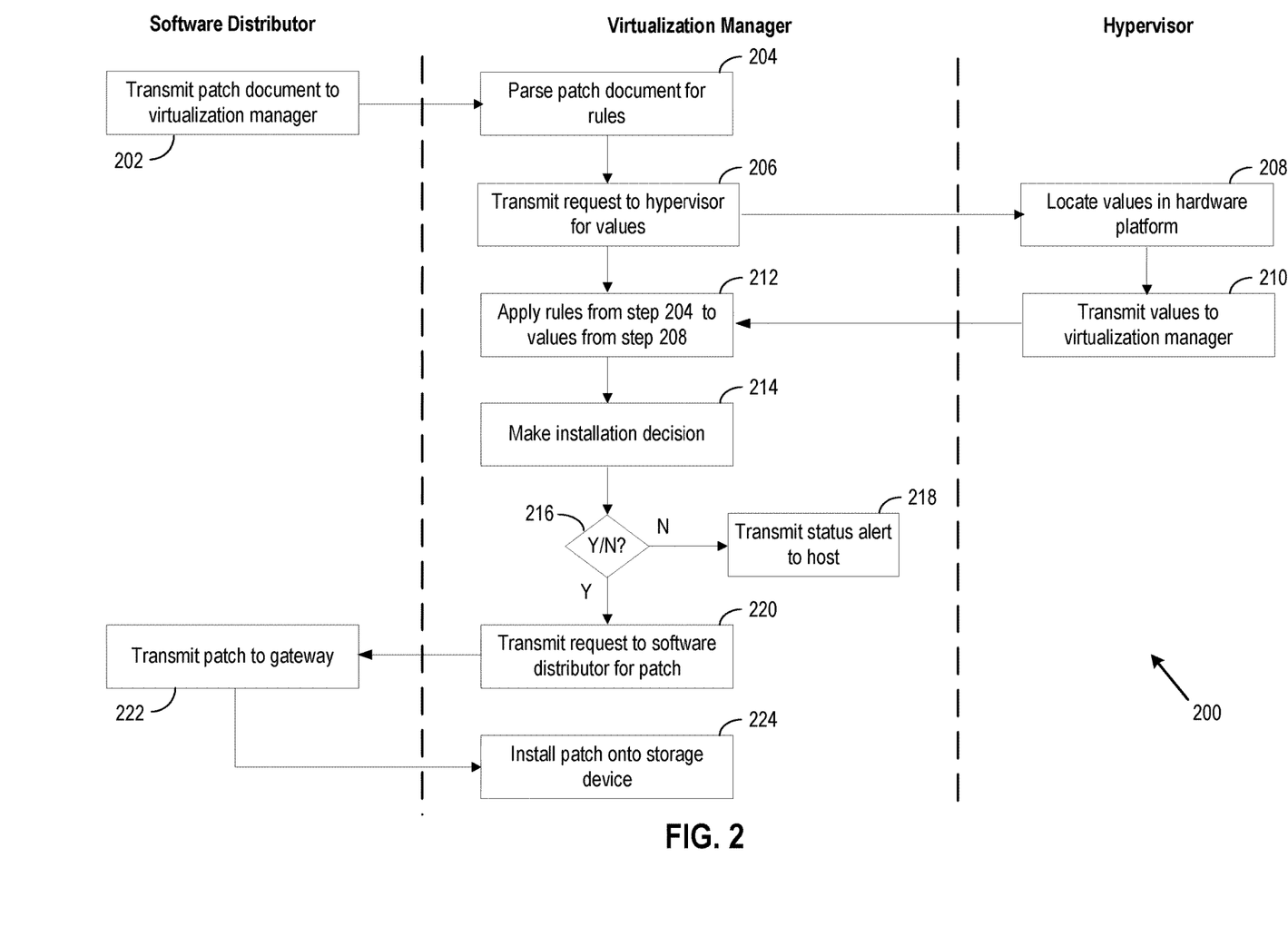
FIG. 2 depicts a flow diagram of a method of installing a patch onto the storage of a host, according to an embodiment.

FIG. 2 depicts a flow diagram of a method 200 of installing patch 162 onto storage system 114 of host 104. FIG. 2 is divided into three swim lanes or columns. The left-hand column, which contains the heading "Software Distributor," includes steps performed by software distributor 160. The middle column, which contains the heading "Virtualization Manager," includes steps performed by the components of virtualization manager 130. The right-hand column, which contains the heading "Hypervisor," includes steps performed by hypervisor 140. In certain embodiments, software distributor 160 triggers method 200 when software distributor 160 detects patch 162, patch 162 containing a set of changes to a major release or to supporting data of that major release, the major release having been previously installed on host 104. In certain embodiments, virtualization manager 130 triggers method 200 by polling software distributor 160 to determine if any patches are available for hosts 104 managed by virtualization manager 130. Although the method steps are described in conjunction with computer system 100 from FIG. 1, a person having ordinary skill in the art would understand that method 200 may also be performed with other types of computer systems. Method 200 may be performed multiple times in order to make an installation decision for each host 104 in data center 102, and then install or not install patch 162 onto host 104.

At step 202, software distributor 160 transmits patch document 164 to virtualization manager 130. Patch document 164 corresponds to patch 162.

At step 204, recommendation engine 134 parses patch document 164 for at least one rule. For example, if patch 162 fixes encryption features on host 104, then patch document 164 may include a rule in which the logic specifies that, if host 104 has enabled encryption, then criticality of installing patch 162 onto host 104 is "red" or "very critical," and if host 104 has not enabled encryption, then criticality is "blue" or "not critical." Such a rule may comprise the property variable "encryption_enabled." The possible values for "encryption_enabled" may be "true" or "false." If host 104 has enabled encryption, then state of host 104 corresponds to a "true" value of the "encryption_enabled" property variable, resulting in criticality being set to "red." If host 104 has not enabled encryption, then state of host 104 corresponds to a "false" value of the "encryption_enabled" property variable, resulting in criticality being set to "blue." In later steps of method 200, state of host 104 is compared to possible values of property variables within patch document 164 to determine criticality, as described below.

At step 206, recommendation engine 134 transmits a request to host 104, such as to hypervisor 140. The request asks for information regarding property variables specified within rules of patch document 164. Continuing the above example, the request may ask hypervisor 140 whether host 104 of hypervisor 140 has enabled encryption. The request may include the specific "encryption_enabled" property variable.

At step 208, hypervisor 140 locates the values that correspond to the property variables requested in step 206. The values may be stored in memory 110 or storage 114 of host 104, or the values may be determined dynamically by accessing other features or information within host 104.

At step 210, hypervisor 140 transmits the located values to recommendation engine 134. Continuing the above example, hypervisor 140 may locate or determine information indicating that host 104 has enabled encryption. Enabled encryption corresponds to the possible value of "true" of the "encryption_enabled" property variable. Hypervisor 140 transmits the information or the value "true" to recommendation engine 134.

At step 212, recommendation engine 134 applies the rules parsed from patch document 164 to the information or values received from hypervisor 140. Recommendation engine 134 assigns a criticality to host 104 by following the logic of the rules parsed from patch document 164. Continuing the above example, recommendation engine 134 may set criticality for host 104 to "red" because the "encryption_enabled" property variable for host 104 has a value of "true," as a result of host 104 having enabled encryption.

At step 214, update manager 132 receives criticality determined by recommendation engine 134. Update manager 132 uses criticality for host 104 to determine whether or not to install patch 162 onto storage system 114 of host 104.

In one embodiment, update manager 132 makes the installation decision automatically based on criticality. The decision of update manager 132 may also specify when to initiate the installation. Continuing the above example, update manager 132 installs patch 162, because installation criticality is "red." Installation that dynamically depends on state of host 104 improves operation of data center 102 because update manager 132 does not initiate an installation of patch 162 unless patch 162 is sufficiently critical to host 104, thereby saving on compute resources of the host 104 for installing the patch, downtime of host 104, network bandwidth for distributing the patch to host 104, etc.

In a second embodiment, an administrator or client of data center 102 makes an installation decision based on criticality determined by recommendation engine 134. In the second embodiment, recommendation engine 134 transmits an alert to host 104, the alert containing criticality for host 104. VCI 120 displays criticality on a client computing device so that the client may make an informed installation decision. The client may specify his decision through a user interface, such as by clicking a button in a pop-up window on the client computing device. Hypervisor 140 then transmits the installation decision to update manager 132. The client's decision may also specify when to initiate the installation.

Whether update manager 132 or client makes the installation decision, the installation decision may also specify to install patch 162 onto a cluster 144 of hosts 104. Installing patch 162 onto cluster 144 of hosts 104 involves installing patch 162 onto each host 104 in cluster 144.

At step 216, update manager 132 responds to the installation decision. If the decision is not to install patch 162, then at step 218, update manager 132 transmits an alert to the client. Step 218 is optional. The alert may indicate information such as an option to receive a reminder in the future about installing patch 162. After step 218, method 200 ends.

If the decision from step 216 is to install patch 162, then at step 220, update manager 132 transmits a request to software distributor 160 to transmit patch 162 to update manager 132 via gateway 124. At step 222, software distributor 160 transmits patch 162 to update manager 132 via gateway 124 and network 150.

At step 224, update manager 132 installs patch 162 onto host 104. After step 224, method 200 ends.

If data center 102 contains a cluster 144 of hosts 104, then update manager 132 may install patch 162 onto each host 104 within cluster 144. For example, installation criticality may be "red" or "very critical" for a cluster 144 and update manager 132 may install patch 162 onto each host 104 within cluster 144. In order to assign a criticality to a cluster 144, update manager 132 may transmit a request to each host 104 within cluster 144, asking each host 104 for information regarding property variables specified within rules of patch document 164. The hypervisor 140 in each host 104 locates the values that correspond to the requested property variables and transmits the located values to recommendation engine 134. Recommendation engine 134 applies the rules parsed from patch document 164 to the information or values received from each hypervisor 140. Recommendation engine 134 assigns a criticality to each host 104 by following the logic of the rules parsed from patch document 164. Recommendation engine 134 compares the criticalities of each host 104 to assign a criticality to cluster 144.

For example, in a cluster 144, criticality may be "red" or "very critical" for a first host 104, criticality may be "blue" or "not critical" for a second host 104, and criticality may be "blue" for a third host 104. In one embodiment, criticality for cluster 144 may equal the highest criticality of host(s) 104 within cluster 144. In this example and embodiment, criticality is "red" for cluster 144, because "red" is the highest criticality of host(s) 104 within cluster 144. Based on the criticality for cluster 144, update manager 132 may install patch 162 onto the first host 104, second host 104, and third host 104.

In a second embodiment, criticality for cluster 144 may equal the lowest criticality of host(s) 104 within cluster 144. Continuing the above example for this second embodiment, criticality is "blue" for cluster 144, because "blue" is the lowest criticality of host(s) 104 within cluster 144.

In a third embodiment, criticality for cluster 144 may equal the most common criticality of host(s) 104 within cluster 144. Continuing the above example for this third embodiment, criticality for cluster 144 may be "blue," "blue" being the criticality for two of the three hosts 104 within cluster 144. Other embodiments for determining criticality for cluster 144, consistent with the teachings herein, may be used.

Although method 200 is discussed using the example property variable that represents whether encryption is enabled on a host, method 200 applies to other property variables. Another example of a property variable is "data_efficiency." The "data_efficiency" property variable may refer to the efficiency of a process that can be applied to data, such as a write to storage 114 or a read from storage 114. The possible values for "data_efficiency" may be "true" or "false." For example, CPU 108 may receive a read request to read data from storage 114. If CPU 108 can complete the read request within a certain amount of time, then state of host 104 corresponds to a "true" value of the "data_efficiency" property variable. If CPU 108 cannot complete the read request within a certain amount of time, then state of host 104 corresponds to a "false" value of the "data_efficiency" property variable.

Another example of a property variable is "disk_format_version." The possible values for "disk_format_version" may reflect the version of a disk formatting protocol used on the disk, such as on storage 114. The possible values may be sequences of characters that correspond to the version of the disk formatting protocol. For example, if each physical disk in storage system 114 follows version 5 of a certain disk formatting protocol, then state of host 104 corresponds to the value "5."

Another example of a property variable is "datastore_full." The "datastore_full" property variable is associated with possible values representing the percentage of storage 114 on host 104 that is full. The possible values for "datastore_full" may be percentages, each percentage representing the portion of storage system 114 that is full and cannot be written to without corrupting data. For example, if 80% of storage system 114 is full, then state of host 104 corresponds to a "datastore_full" value of "80%."

Another example of a property variable is "allflash." The possible values for "allflash" may be "true" or "false." If each physical storage device in storage system 114 is a flash-based storage device, then state of host 104 corresponds to a "true" value of the "allflash" variable. If at least one physical storage device in storage system 114 is not a flash-based storage device, then state of host 104 corresponds to a "false" value of the "allflash" variable.

If update manager 132 decides not to install patch 162 onto host 104, recommendation engine 134 may periodically monitor state of host 104 in order to dynamically determine if criticality changes for host 104. Virtualization manager 130 may store patch document 164 for a period of time, such as a month. Virtualization manager 130 may also store patch document 164 until a certain event occurs, such as software distributor 160 transmitting a new patch document for the same major release. Steps 204-224 of method 200 may be repeated periodically to dynamically update recommendation engine 134 regarding state of host 104. These steps may be repeated, for example, every hour, day, or week, for same patch document 164. Recommendation engine 134 may dynamically recalculate criticality of installing patch 162 onto host 104 using updated state of host 104 and stored patch document 164.

It should be understood that, for any process described herein, there may be additional or fewer steps performed in similar or alternative orders, or in parallel, within the scope of the various embodiments. Such changes are consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or the apparatus may be a general purpose computer selectively activated or configured by a computer program stored in the computer. In particular, various general purpose machines may be used with computer programs written in accordance with the teachings herein, or constructing a more specialized apparatus to perform the required operations may be more convenient.

The various embodiments described herein may be practiced with other computer system configurations including hand-held devices, microprocessor systems, microprocessor-based or programmable consumer electronics, minicomputers, mainframe computers, application-specific integrated circuits (ASICs), field-programmable gate arrays (FPGAs), and the like.

One or more embodiments of the present invention may be implemented as one or more computer programs or as one or more computer program modules embodied in one or more computer-readable media. The term computer-readable medium refers to any data storage device that can store data which can thereafter be input to a computer system— computer-readable media may be based on any existing or subsequently developed technology for embodying computer programs in a manner that enables them to be read by a computer. Examples of a computer-readable medium include a hard drive, network-attached storage (NAS), read-only memory (ROM), random-access memory (RAM), (e.g., flash memory devices), compact disk (CD), (e.g., CD read only memory (CD-ROM), CD recordable (CD-R), or CD re-writable (CD-RW)), digital virtual disk (DVD), magnetic tape, and any other optical or non-optical data storage device. The computer-readable medium can also be distributed over a network coupled computer system such that the computer-readable code is stored and executed in a distributed fashion.

Although one or more embodiments of the present invention have been described in some detail for clarity of understanding, certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements or steps do not imply any particular order of operation, unless explicitly stated in the claims.

Virtualization systems in accordance with the various embodiments may be implemented as hosted embodiments, non-hosted embodiments, or as embodiments that tend to blur distinctions between the two. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share hardware resources. In one embodiment, these contexts are isolated from each other, each having at least a user application running therein. The hardware abstraction layer thus provides benefits of resource isolation and allocation among the contexts. In the foregoing embodiments, VMs are used as an example for the contexts and hypervisors as an example for the hardware abstraction layer. As described above, each VM includes a guest OS in which at least one application runs.

It should be noted that these embodiments may also apply to other examples of contexts, such as containers not including guest OS's, referred to herein as "OS-less containers". OS-less containers implement OS-level virtualization, wherein an abstraction layer is provided on top of the kernel of an OS on a host computer. The abstraction layer supports multiple OS-less containers, each including an application and its dependencies. Each OS-less container runs as an isolated process in user space on the host OS and shares the kernel with other containers. The OS-less containers rely on the kernel's functionality to make use of resource isolation (e.g., isolation of the host's CPU, memory, block I/O, and network) and separate namespaces to completely isolate an application's view of the operating environments. By using OS-less containers, resources can be isolated, services can be restricted, and processes can be provisioned to have private views of the OS with their own process ID spaces, file system structures, and network interfaces. Multiple containers can share the same kernel, but each container can be constrained to only use a defined amount of resources.

Many variations, modifications, additions, and improvements are possible, regardless of the degree of virtualization. The virtualization software can therefore include components of a host, console, or guest OS that performs virtualization functions. Plural instances may be provided for components, operations or structures described herein as a single instance. Boundaries between various components, operations, and data storages are somewhat arbitrary, and particular operations are illustrated in the context of specific illustrative configurations. Other allocations of functionality are envisioned and may fall within the scope of the invention (s). In general, structures and functionalities presented as separate components in exemplary configurations may be implemented as a combined structure or component. Similarly, structures and functionalities presented as a single component may be implemented as separate components. These and other variations, modifications, additions, and improvements may fall within the scope of the appended claims.

We claim:

1. A method of installing, by a data center manager, a patch onto a first computing device of one or more computing devices in a data center, the method comprising:

parsing a machine-readable document corresponding to the patch for a property variable and a possible value of the property variable, wherein the property variable is indicative of a feature of the first computing device, and wherein the combination of the property variable and the possible value represents a criticality of installing the patch;

transmitting a request to the first computing device for a first value of the first computing device, the first value representing a state of the first computing device corresponding to the property variable;

receiving, from the first computing device, the first value in response to the request;

comparing the possible value to the first value;

based on the comparing, performing a first determination of the criticality of installing the patch onto the first computing device, wherein installing the patch is determined to be critical if: (i) the possible value indicates that the patch affects the feature of the first computing device, and (ii) the first value indicates that the feature is enabled on the first computing device; and based on determining installing the patch is critical, installing the patch onto the first computing device.

2. The method of claim 1, wherein the patch contains updates for a software program that was previously installed onto the first computing device.

3. The method of claim 2, wherein the software program is a hypervisor.

4. The method of claim 1, wherein the first value represents efficiency of data utilization, format version of a physical disk, percent utilization of a storage medium, usage of a software program feature, or presence of flash-based or magnetic-based storage devices.

5. The method of claim 1, further comprising:

after performing the first determination of the criticality of installing the patch onto the first computing device, waiting for a period of time, and transmitting a request to the first computing device for a second value of the first computing device, the second value representing a second state of the first computing device corresponding to the property variable;

receiving the second value;

comparing the possible value of the property variable to the second value; and based on the comparing of the possible value to the second value, performing a second determination of the criticality of installing the patch onto the first computing device, wherein installing the patch onto the first computing device is based on the second determination.

6. The method of claim 1, further comprising:
transmitting a request to a second computing device for a second value of the second computing device, the second value representing a state of the second computing device corresponding to the property variable;
receiving the second value;
comparing the possible value to the second value;
based on the comparing of the possible value to the second value, performing a second determination of the criticality of installing the patch onto the second computing device; and
based on the criticality of installing the patch onto the first computing device and the criticality of installing the patch onto the second computing device, installing the patch onto the second computing device.

7. The method of claim 6, wherein the criticality of installing the patch onto the first computing device is higher than the criticality of installing the patch onto the second computing device.

8. The method of claim 6, wherein the criticality of installing the patch onto the first computing device is equal to the criticality of installing the patch onto the second computing device.

9. A non-transitory computer readable medium comprising instructions to be executed in a processor of a computer system, the instructions when executed in the processor cause the computer system to carry out a method of installing, by a data center manager, a patch onto a first computing device of one or more computing devices in a data center, the method comprising:
parsing a machine-readable document corresponding to the patch for a property variable and a possible value of the property variable, wherein the property variable is indicative of a feature of the first computing device, and wherein the combination of the property variable and the possible value represents a criticality of installing the patch;
transmitting a request to the first computing device for a first value of the first computing device, the first value representing a state of the first computing device corresponding to the property variable;
receiving, from the first computing device, the first value in response to the request;
comparing the possible value to the first value;
based on the comparing, performing a first determination of the criticality of installing the patch onto the first computing device, wherein installing the patch is determined to be critical if: (i) the possible value indicates that the patch affects the feature of the first computing device, and (ii) the first value indicates that the feature is enabled on the first computing device; and
based on determining installing the patch is critical, installing the patch onto the first computing device.

10. The non-transitory computer readable medium of claim 9, wherein the patch contains updates for a software program that was previously installed onto the first computing device.

11. The non-transitory computer readable medium of claim 10, wherein the software program is a hypervisor.

12. The non-transitory computer readable medium of claim 9, wherein the first value represents efficiency of data utilization, format version of a physical disk, percent utilization of a storage medium, usage of a software program feature, or presence of flash-based or magnetic-based storage devices.

13. The non-transitory computer readable medium of claim 9, the method further comprising:
after performing the first determination of the criticality of installing the patch onto the first computing device, waiting for a period of time, and transmitting a request to the first computing device for a second value of the first computing device, the second value representing a second state of the first computing device corresponding to the property variable;
receiving the second value;
comparing the possible value of the property variable to the second value; and
based on the comparing of the possible value to the second value, performing a second determination of the criticality of installing the patch onto the first computing device, wherein installing the patch onto the first computing device is based on the second determination.

14. The non-transitory computer readable medium of claim 9, the method further comprising:
transmitting a request to a second computing device for a second value of the second computing device, the second value representing a state of the second computing device corresponding to the property variable;
receiving the second value;
comparing the possible value to the second value;
based on the comparing of the possible value to the second value, performing a second determination of the criticality of installing the patch onto the second computing device; and
based on the criticality of installing the patch onto the first computing device and the criticality of installing the patch onto the second computing device, installing the patch onto the second computing device.

15. The non-transitory computer readable medium of claim 14, wherein the criticality of installing the patch onto the first computing device is higher than the criticality of installing the patch onto the second computing device.

16. The non-transitory computer readable medium of claim 14, wherein the criticality of installing the patch onto the first computing device is equal to the criticality of installing the patch onto the second computing device.

17. A computer system comprising:
a patch and a machine-readable document;
a first computing device; and
a processor, wherein the processor is programmed to carry out a method of installing the patch onto the first computing device, the method comprising:
parsing the machine-readable document corresponding to the patch for a property variable and a possible value of the property variable, wherein the property variable is indicative of a feature of the first computing device, and wherein the combination of the property variable and the possible value represents a criticality of installing the patch;
transmitting a request to the first computing device for a first value of the first computing device, the first value representing a state of the first computing device corresponding to the property variable;
receiving, from the first computing device, the first value in response to the request;
comparing the possible value to the first value;
based on the comparing, performing a first determination of the criticality of installing the patch onto the first computing device, wherein installing the patch is determined to be critical if: (i) the possible value indicates that the patch affects the feature of the first computing device, and (ii) the first value indicates that the feature is enabled on the first computing device; and based on determining installing the patch is critical, installing the patch onto the first computing device.

18. The computer system of claim 17, wherein the first value represents efficiency of data utilization, format version of a physical disk, percent utilization of a storage medium, usage of a software program feature, or presence of flash-based or magnetic-based storage devices.

19. The computer system of claim 17, the method further comprising:

after performing the first determination of the criticality of installing the patch onto the first computing device, waiting for a period of time, and transmitting a request to the first computing device for a second value of the first computing device, the second value representing a second state of the first computing device corresponding to the property variable;

receiving the second value;

comparing the possible value of the property variable to the second value; and based on the comparing of the possible value to the second value, performing a second determination of the criticality of installing the patch onto the first computing device, wherein installing the patch onto the first computing device is based on the second determination.

20. The computer system of claim 17, the method further comprising:

transmitting a request to a second computing device for a second value of the second computing device, the second value representing a state of the second computing device corresponding to the property variable;

receiving the second value;

comparing the possible value to the second value;

based on the comparing of the possible value to the second value, performing a second determination of the criticality of installing the patch onto the second computing device; and based on the criticality of installing the patch onto the first computing device and the criticality of installing the patch onto the second computing device, installing the patch onto the second computing device.

* * * * *